United States Patent
Lier et al.

(10) Patent No.: US 8,015,151 B2
(45) Date of Patent: Sep. 6, 2011

(54) METHOD AND SYSTEM FOR MANAGING AND MODIFYING TIME DEPENDENT DATA STRUCTURES

(75) Inventors: Karlheinz Lier, Rauenberg (DE); Jörg Heitmann, Walldorf (DE); Gaogao Zheng, Shanghai (CN)

(73) Assignee: SAP AG, Walldorf ( * ) Notice: Subject to any disclaimer, the term of this patent is extended or adjusted under 35 U.S.C. 154(b) by 415 days.

(21) Appl. No.: 12/325,668

(22) Filed: Dec. 1, 2008

(65) Prior Publication Data

US 2010/0114818 A1    May 6, 2010

Related U.S. Application Data

(60) Provisional application No. 61/190,058, filed on Oct. 13, 2008, provisional application No. 61/106,843, filed on Oct. 20, 2008.

(51) Int. Cl.
*G06F 17/30* (2006.01)

(52) U.S. Cl. ........ 707/610; 707/624; 707/625; 707/638; 717/174; 717/176; 717/177

(58) Field of Classification Search .................... 726/22; 717/174, 176, 177; 707/802, 610, 620, 621, 707/624, 625, 638

See application file for complete search history.

(56) References Cited

U.S. PATENT DOCUMENTS

| | | | | |
|---|---|---|---|---|
| 5,926,814 A | * | 7/1999 | Fridman | 700/16 |
| 6,795,830 B1 | * | 9/2004 | Banerjee et al. | 1/1 |
| 6,993,657 B1 | * | 1/2006 | Renner et al. | 713/182 |
| 7,321,894 B2 | * | 1/2008 | Degtyar et al. | 1/1 |
| 7,536,686 B2 | * | 5/2009 | Tan et al. | 717/174 |
| 7,624,159 B2 | * | 11/2009 | Kohs | 709/217 |
| 7,673,340 B1 | * | 3/2010 | Cohen et al. | 726/22 |
| 7,739,308 B2 | * | 6/2010 | Baffier et al. | 707/802 |
| 7,958,133 B2 | * | 6/2011 | Korn | 707/755 |
| 2004/0260678 A1 | * | 12/2004 | Verbowski et al. | 707/3 |
| 2006/0143148 A1 | * | 6/2006 | Degtyar et al. | 707/1 |
| 2006/0190429 A1 | * | 8/2006 | Sidlosky et al. | 707/3 |
| 2006/0200827 A1 | * | 9/2006 | Sidlosky et al. | 719/310 |
| 2006/0248521 A1 | * | 11/2006 | Korn | 717/163 |
| 2007/0124302 A1 | * | 5/2007 | Korn et al. | 707/6 |

* cited by examiner

*Primary Examiner* — Jean M Corrielus
(74) *Attorney, Agent, or Firm* — Kenyon & Kenyon LLP

(57) ABSTRACT

A system, method, and computer-readable medium having instructions thereon for executing a method are provided for effecting modification of, e.g., updating, a target application or document. An embodiment of the present invention provides for the updating of a target application or document having specific time split operations in, for example, an enterprise resources planning system (ERP).

13 Claims, 12 Drawing Sheets

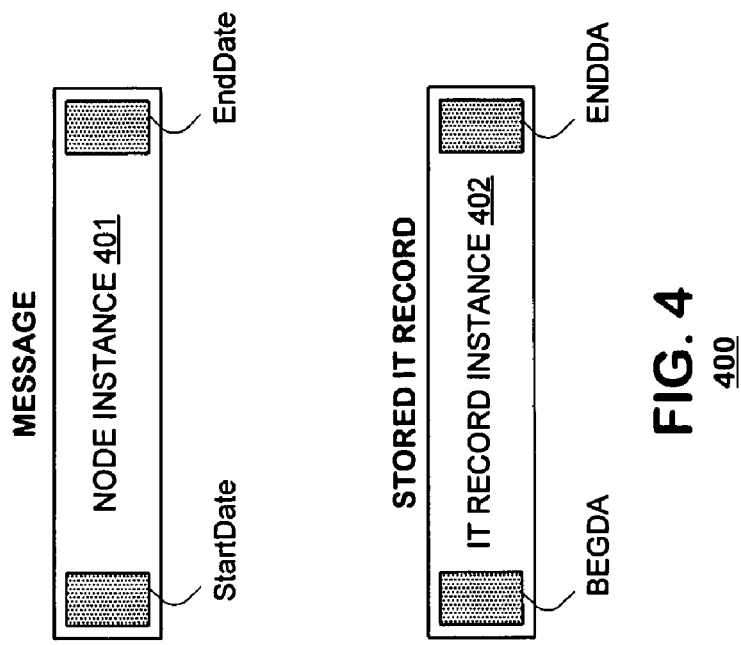
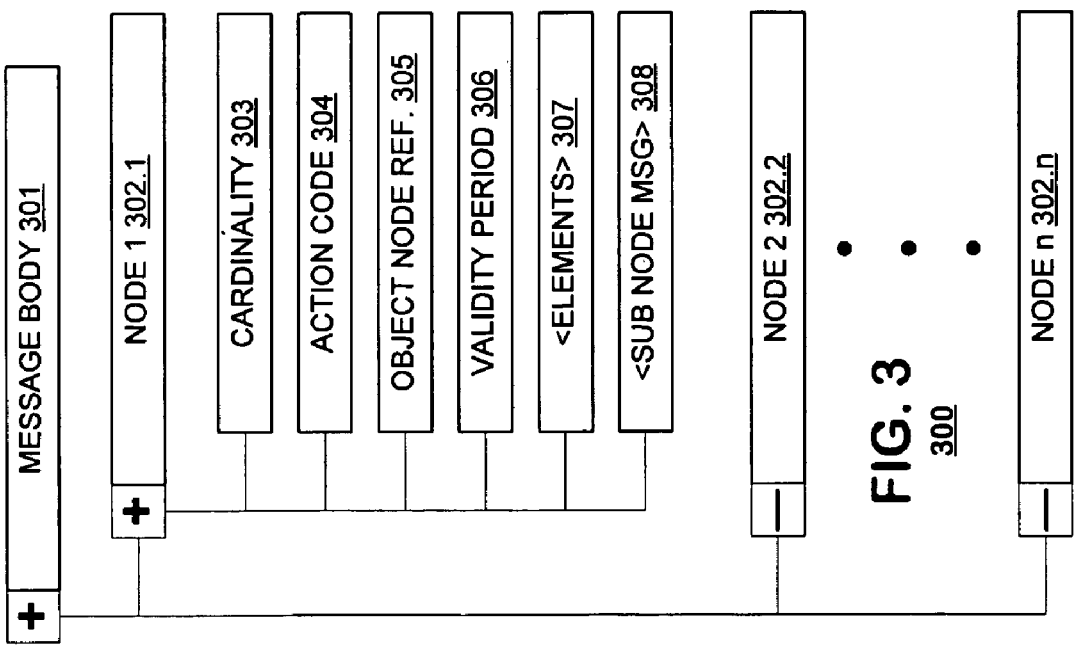

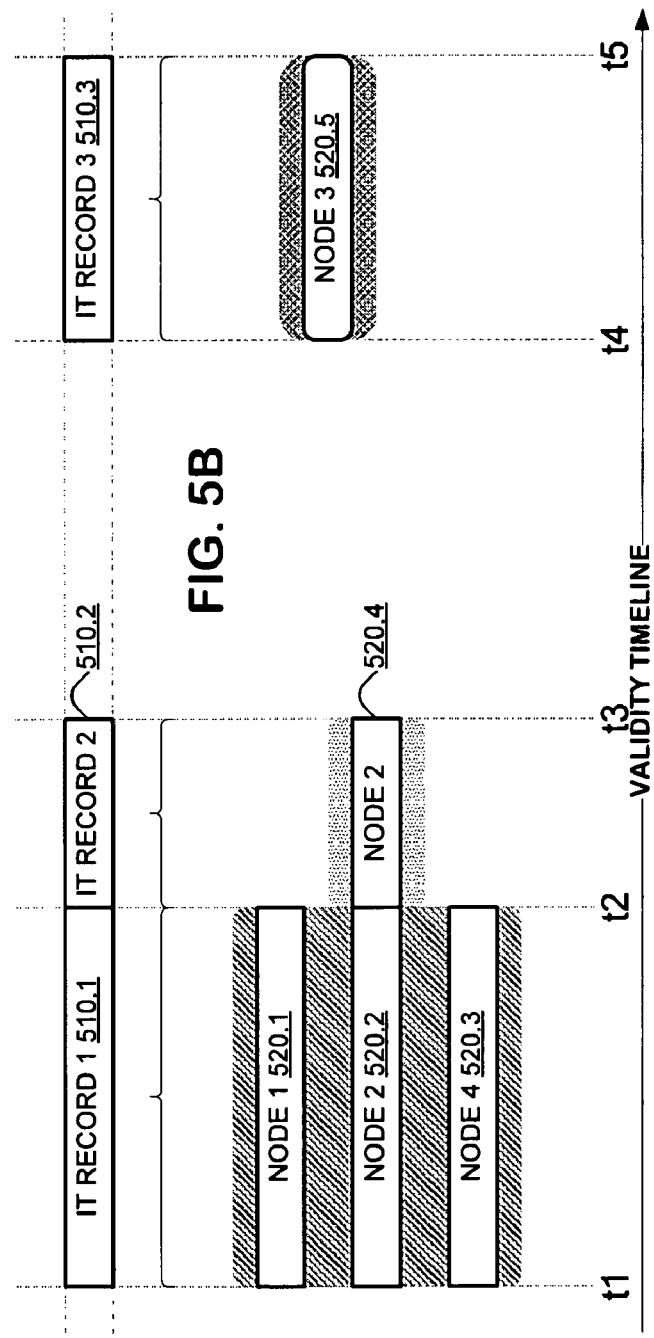

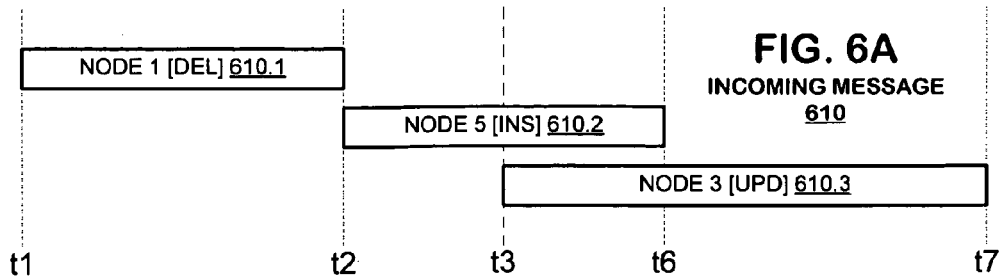
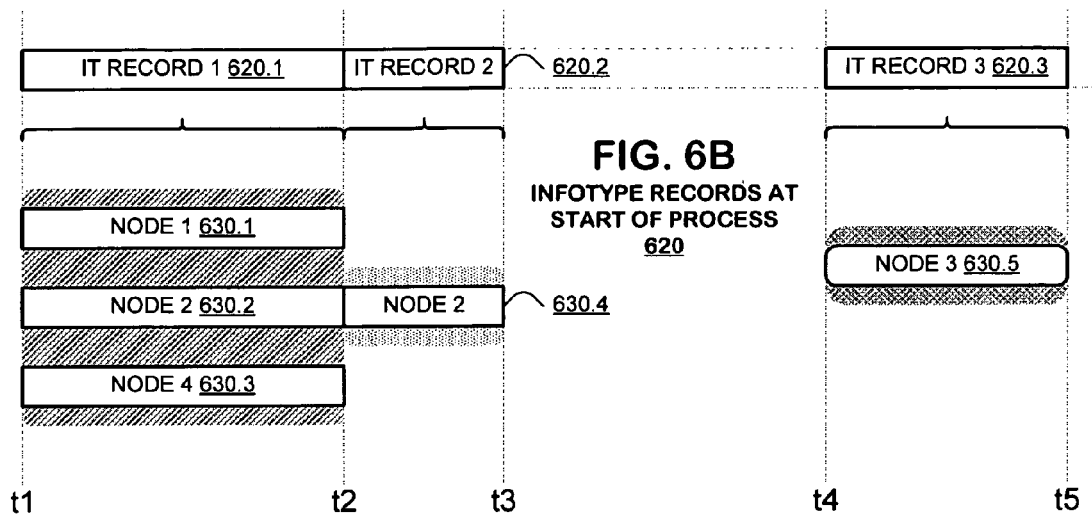
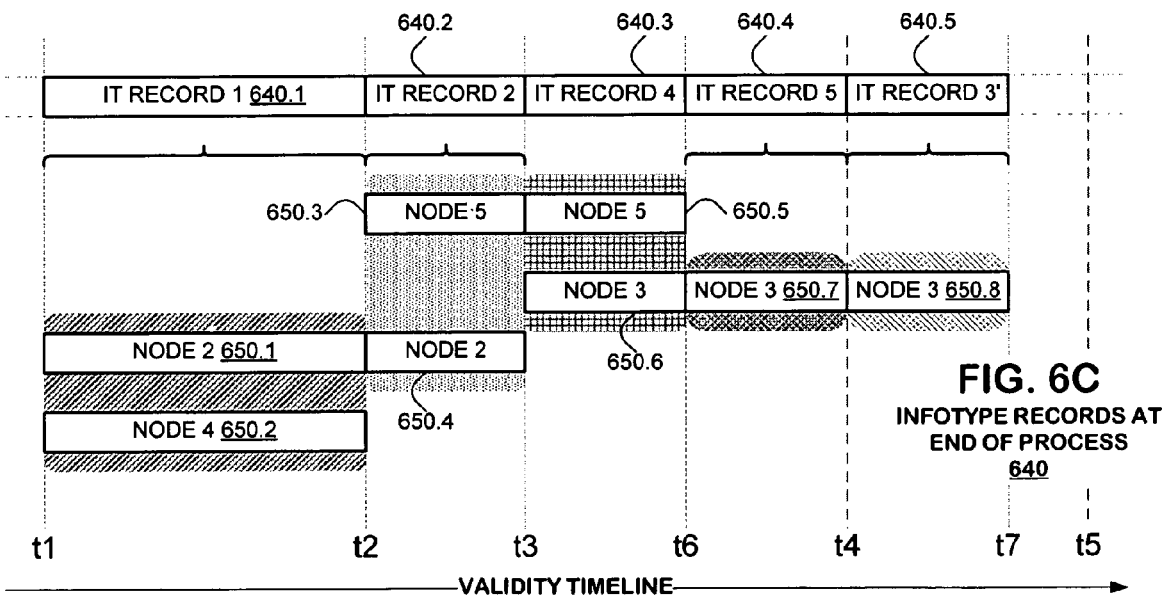

FIG. 6D

| MAPPING TABLE | |
|---|---|
| IT RECORD 1 | NODE 2 |
| IT RECORD 1 | NODE 4 |
| IT RECORD 2 | NODE 2 |
| IT RECORD 2 | NODE 5 |
| IT RECORD 4 | NODE 3 |
| IT RECORD 4 | NODE 5 |
| IT RECORD 3' | NODE 3 |

800

900

METHOD AND SYSTEM FOR MANAGING AND MODIFYING TIME DEPENDENT DATA STRUCTURES

CROSS-REFERENCE TO RELATED APPLICATIONS

This application claims the benefit of priority afforded by provisional applications Ser. No. 61/106,843, filed Oct. 20, 2008 and Ser. No. 12/250,532, filed Oct. 13, 2008.

BACKGROUND

Business systems may involve a variety of software applications and documents. Such software applications or documents may have updates which are released as new versions of the software application. In updating a software application or document with a new version, the target application or document is updated from a source application or document through the exchange of "delta information," change information. However, sometimes the software application or document is deeply structured into time dependent subsections that do not allow for direct mapping and/or subsequent updating between a source and a target application or document. Accordingly, a need exists for a more robust updating and mapping system which allows for the update of an application or document involving, for example, time dependent data structures.

BRIEF DESCRIPTION OF THE DRAWINGS

FIG. 3 shows an message body 301 structure for a delta change message according to an embodiment of the present invention.

FIG. 4 illustrates node instances and Infotype record instances according to an embodiment of the present invention.

FIGS. 6-11 illustrates examples of processing of a delta change message and changes to Infotype records according to an embodiment of the present invention.

DETAILED DESCRIPTION

An embodiment of the present invention provides for modification of, e.g., updating, a target application or document. An embodiment of the present invention provides an enhancement and improvement of existing delta update methodologies. An embodiment of the present invention provides for the updating of a target application or document having specific time split operations in an enterprise resources planning system (ERP).

An embodiment of the present invention provides a mapping and/or updating methodology useful to a variety of industries. For example, the present invention may be useful to an external payroll provider, whose system may necessarily involve complex and/or time-dependent data structures. A payroll system involves time-dependent features. For example, the software business object and interface message structures involved in a system, such as a payroll system, may need updating at different times. And, for complex systems, the relationship between the source document or application and the target document or application may not allow for a one-to-one mapping of features, e.g., software business objects and their attributes. Embodiments of the present invention provide for an updating methodology which accounts for such features in a complex systems.

Figure 1:
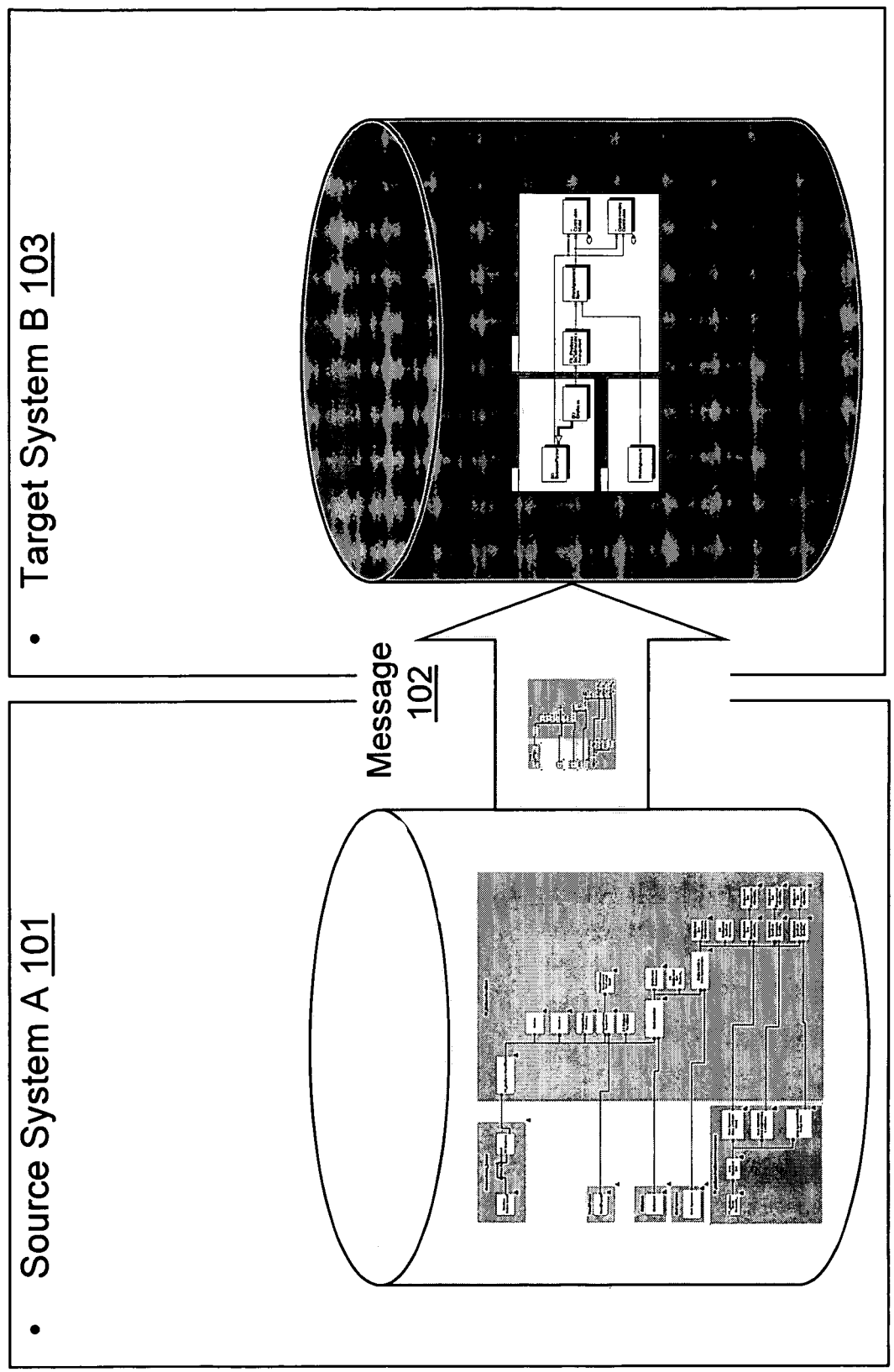
FIG. 1 illustrates a system according to an embodiment of the present invention.

FIG. 1 shows an example message-based delta update system. In this example, a Source System A 101 processes data which may require updates to be communicated to System B 103. System A exchanges "delta update" messages as structured XML-based messages 102 from System A 101 to System B 103. Target System B 103 may receive the incoming messages 102 and update its own data.

The Source System A and Target System B both may be provided in an Enterprise Resources Planning (ERP) system, which manages business operations for a firm. ERP systems are well known. They typically include a suite of interoperable applications (the systems A and B shown in FIG. 1) that execute workflows through which firm employees perform business operations. For example, firm employees may process purchase orders received from the firm's business partners via workflows performed by a Customer Relationship Management (CRM) application. The CRM application may communicate with other applications, for example, Inventory Control applications and Accounting applications to manage product delivery and accounting functions respectively. The CRM application, Inventory Control applications and Accounting applications may communicate with each other as shown in FIG. 1.

The systems A, B typically store transaction data in a plurality of data objects, called "business objects." In a CRM application, a business object may be created for each purchase order received by the firm. In a Human Resources application, business objects may be created for various employee management transactions, such as hiring of employees, changes in benefits status, changes in compensation and perhaps termination of employment. Thus, depending on the size and level of activity of a firm, the various systems A and B may store thousands of business objects in the regular course of operation.

Delta messages are messages that govern changes to the structure of business objects among systems. System A may perform an operation that requires a change to a business object in System B, not only to the content stored by the business object but also to the structure of the object. Thus, the structure of business objects in System B may change over time as determined by changes communicated to System B by System A. A delta message communicates such changes.

Figure 2:
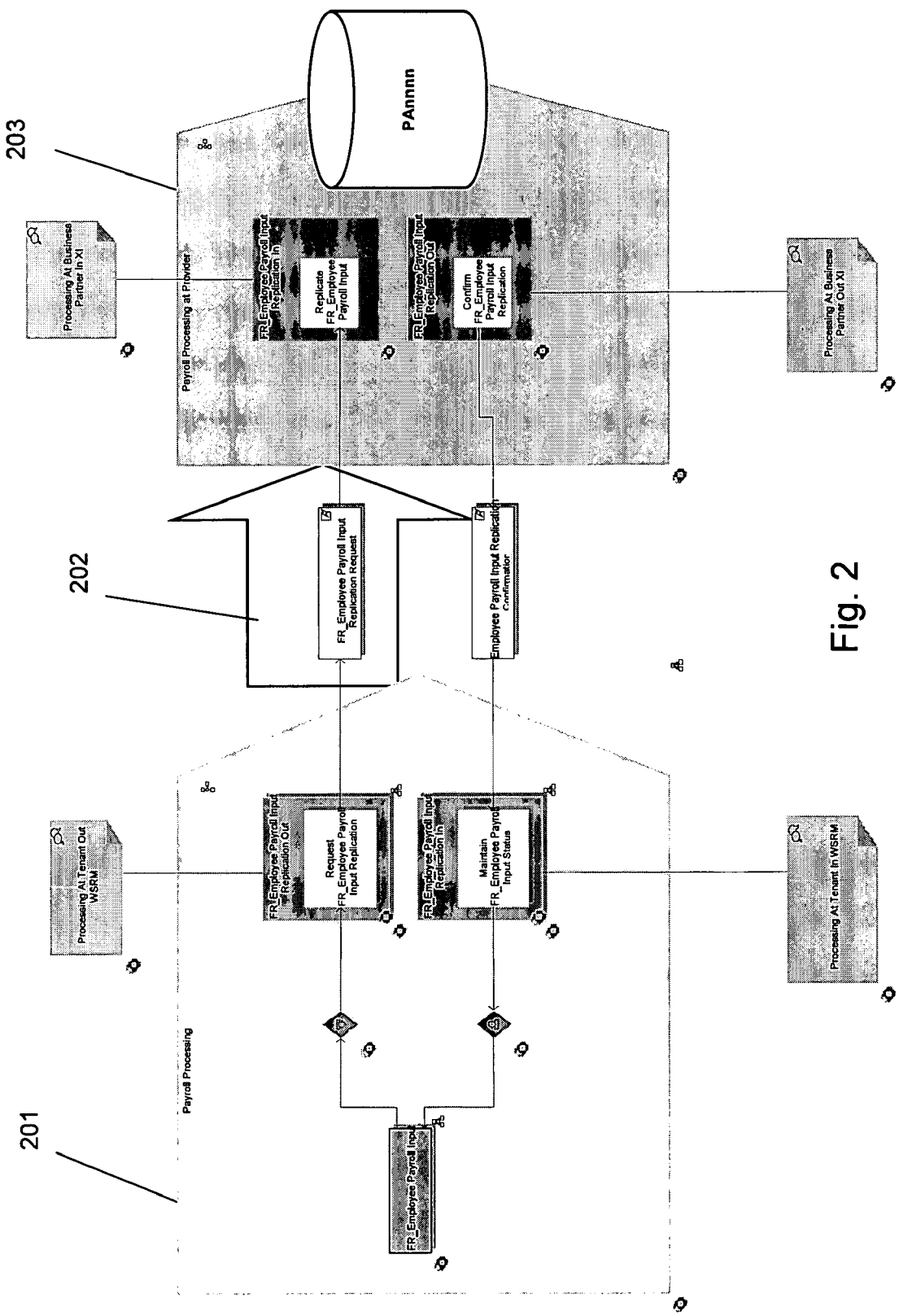
FIG. 2 illustrates another system according to an embodiment of the present invention.

FIG. 2 shows an example of the system of FIG. 1 in the context of a payroll management application. FIG. 2 demonstrates the interaction between components for payroll processing at a French (FR) provider. For example, in a Payroll Processing System 201, employee data are stored which are needed in the Payroll Provider System 203 in order to calculate net from gross. A request ("FR_EmployeePayrollInputReplicationRequest") is originated in the Payroll Processing System, and is then sent 202 with multiple instance nodes to the Payroll Processing System at the Provider 203. The multiple instance nodes may include, e.g., a time dependent node. For example, a time dependent node for a social insurance model may exist. In such example, the time dependent node may be associated with a social insurance type code and contains the contribution model code in its structure. For example, sample code may read as follows:

```
-<EmployeeSocialInsuranceArrangementContributionModel
  actionCode = "01">
  -<ObjectNodeReference>
     <ObjectID>1100643015601E455A1ECBBCCB1837E3B44485
     </ObjectID>
     <ObjectTypeCode>404</ObjectTypeCode>
     <ObjectNodeTypeCode>17000</ObjectNodeTypeCode>
  </ObjectNodeReference>
  -<ValidityPeriod>
     <StartDate>2008-10-01</StartDate>
     <EndDate>9999-12-31</EndDate>
  </ValidityPeriod>
  <SocialInsuranceTypeCode>1</SocialInsuranceTypeCode>
  <EmployeeSocialInsuranceContributionModelCode>1</Employee
SocialInsuranceContributionModelCode>
```

The appropriate response is then processed and returned back to the Payroll Processing System 201. If the request 202 is successfully processed the information is replicated so that a subsequent request for a Payroll Run can be originated in the Payroll Process System 201. Further, each of the Payroll Processing System 201 and Payroll Processing System at the Provider 203 may access outside resources for, e.g., processing.

In an embodiment of the present invention, a target business object may be represented by Infotypes ("IT"). When the structure of a business object in a target system changes over time, the business object may be represented by multiple Infotypes. Infotypes are database records with business keys and attributes having fields to identify dates on which the Infotype is valid. For example, in the situation of an employee's social insurance data in France, a representation may be as follows:

```
          PA0064 (Social Insurance - France)
          Key:
                PERNR (Personnel Number)
                SUBTY (Subtype)
                ...
                ENDDA (End Date)
                BEGDA (Begin Date)
          Attributes:
          NUMSS
          CLESS
          TPART
          REGNO
          ...
          REGSS
          REGAC
          REGRT
```

PA0064 is an Infotype structure having four attributes (among others), each dedicated to a social insurance type code. When a single business object is represented by multiple Infotype records, the Infotype records will have the same keys (e.g., PERNR and SUBTY) except for the BEGDA and ENDDA values. The Begin and End dates (BEGDA and ENDDA) may differ for the different Infotype records. At most one Infotype record is valid at a point in time. In this example, the attributes (e.g., REGNO, REGSS, REGAC, and REGRT) are fields which are linked to different social insurance types in this example. For example, REGNO is filled with the contribution model code of social insurance type 1, etc. Each field is filled with a code of a corresponding contribution model. Thus up to four nodes (like those introduced as an example in [14]) can feed an Infotype record.

FIG. 3 shows an message body 301 structure for a delta change message 300 according to an embodiment of the present invention. The general message structure may be considered as a tree of nodes 302.1-302.n. Each node 302.1 within the message 300 may identify a change to be implemented at the receiver system (e.g., System B in FIG. 1). Each node may include multiple fields including an actionCode 304, an ObjectNodeReference 305, a ValidityPeriod 306, one or more elements 307 and, optionally, sub-node messages 308. The actionCode 304 may identify an action to be performed by the target system, for example, to insert a new node (represented as [INS] in subsequent discussion), to update a previously created node ([UPD]) or to delete a node ([DEL]). The ObjectNodeReference 305 includes an Object identifier (e.g., Universally Unique Identifier—"UUID") pointing to business documents in the source system. The ObjectNodeReference 305 also includes a NodeTypeCode identifying different node types. The ValidityPeriod 306 includes a STARTDATE and an ENDDATE for the delta change. The <elements> 307 includes new data to be stored in the target system for INS and UPD actioncodes. The content may be, for example, amounts, identifiers, codes, nodes, etc. Optional sub-node messages 308 may be included, which inherit properties (such as validity dates) of the master nodes to which they belong. A message 300 may include a single node 302.1 or multiple nodes 302.1-302.n as determined by system operations.

A sample code concerning FIG. 3 may be represented as follows:

```
- <MessageBody>
   - <Node 1 actionCode = "...">
      <ObjectNodeReference>
         <ObjectID>2045601E45...</ObjectID>
         <ObjectNodeTypeCode>...</ObjectNodeTypecode>
      </ObjectNodeReference>
   - <ValidityPeriod>
         <StartDate>2008-10-01</StartDate>
         <EndDate>9999-12-31</EndDate>
      </ValidityPeriod>
      <Element1>1621101317546/03</Element1>
      <Element2>...</Element2>
   </Node1>
   <Node2 actionCode="...">...</Node2>
   ...
</MessageBody>
```

The target system may store Infotype records as a set of flat database records including a business key, a validity period, and attribute fields fed by message node elements. For example:

```
            Target Infotype Record Structure:
            Key:
            ... (Business Key)
            ENDDA(End Date)
            BEGDA(Begin Date)
            Attributes:
            FIELD1
            ...
            FIELDN
```

In this example, the BEGDA and ENDDA are part of the key. The Infotype records may have the same business key but differ in BEGDA and/or ENDDA and fulfill one of the following time constraints:
1. there is a validity period (defined by the lowest BEGDA and highest ENDDA of the Infotype record set) in which exactly one record is valid at any given point in time inside the validity period; this means no "gaps" in time are allowed within the validity period.

2. there is a validity period in which at most one record is valid at any given point in time inside the validity period this means "gaps" in time are allowed within the validity period.

If one of the above mentioned time constraints are fulfilled for a given system feature, a validity time line can be defined for processing delta change messages from an external system.

In an example, given a business object, a set of Infotype records may be retrieved that define a validity time line including all BEGDA and ENDDA values which have been created by a set of nodes representing certain business documents in the source system.

The validity time line also reflects the validity periods of nodes which are in sync with the business documents in the source system referred to by the object node references. An N:M mapping between the object node references and Infotype records may be stored in the target system. As part of the Infotype record, keys BEGDA and ENDDA may also be saved. If documents are created, deleted or changed in the source system, then a new message will be sent with nodes and the corresponding action codes. Embodiments of the present invention provide a system and method for handling N node instances of an incoming message and the corresponding changes to the set of existing Infotype records (or other such records in other applications), the mapping, and the corresponding validity timeline.

FIG. 4 shows an example structure of a node instance 401 that is communicated between systems in delta change messages. The node instance 401 includes StartDate and an EndDate identifiers which identify time periods over which the respective node instance is valid. FIG. 4 also illustrates an example structure for an Infotype record instance 402 as stored by System B. The Infotype record stores BEGDA and ENDDA fields representing time periods over which the respective Infotype is valid. Infotype records also may store one or more nodes, which are shown in subsequent figures. When stored in Infotype records, nodes do not include validity date identifiers. The BEGDA and ENDDA fields apply globally to all nodes within a respective Infotype record.

FIGS. 5A and 5B illustrate data structures that may be stored a receiver system. FIG. 5A illustrate a mapping table 510, which associates IT records with the nodes that are contained within them. FIG. 5B illustrates the IT Records themselves and the nodes they contain. In this example, IT record 1 510.1 contains nodes 1, 2 and 4 (520.1-520.3), an IT Record 2 510.2 contains node 2 520.4. This is the same node as stored in IT Record 1 510.1 (node 520.2). Also, in this example, IT Record 3 510.3 contains a node 3 520.5.

FIG. 5B illustrates the exemplary IT Records 510.1-510.3 organized along a time line based on the BEGDA and ENDDA values of the respective records. In this example, IT Record1 510.1 and IT Record2 510.2 are adjacent in time but do not overlap. IT Record3 510.3 follows IT Record2 510.2 in time and is separated from IT Record2 by a time gap. Node 2 overlaps between IT Record1 510.1 and IT Record2 510.2; node 2, therefore, is stored in System B in two separate records. On this example the records here fulfill the time constraint 2 of [19].

Figure 5C:
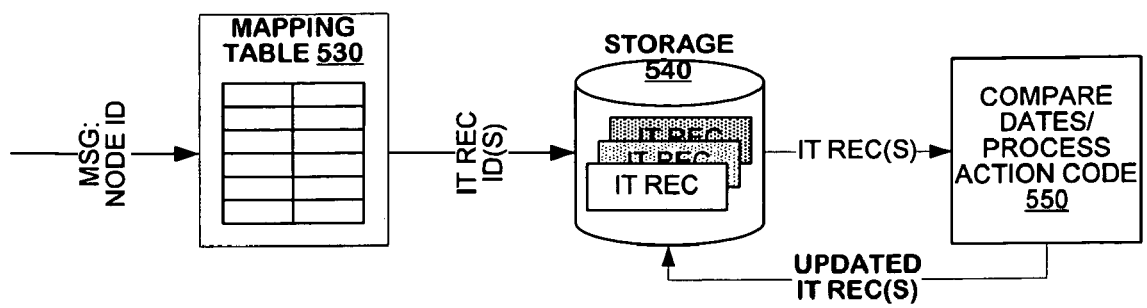
FIG. 5 illustrates Infotype records and an exemplary validity timeline according to an embodiment of the present invention.

FIG. 5C is a data flow diagram illustrating a first method of processing messages, according to an embodiment of the present invention. In this example, for each node contains in a delta change message, the receiving system may compare node identifiers in the message to node identifiers in the mapping table 530. From the mapping table 530, the system may identify IT Records that store data relevant to message. Thereafter, the system may retrieve the relevant IT Records from storage 540 and process them according to the delta message 550. Specifically, the system may compare data identifiers from the message to the data identifiers from the IT Records and process the action code from the message on the relevant IT Records. Updated IT Records may be returned to storage 540.

FIG. 6 provides an example of message processing according to an embodiment of the present invention. FIG. 6A illustrates an exemplary delta change message that may be received by a system. FIG. 6B illustrates exemplary IT Records as they may exist prior to message processing. FIG. 6B illustrates the same example as provided in FIG. 5B. FIG. 6C illustrates the IT Records as they may exist following processing of the message of FIG. 6A. For ease of discussion, message nodes and IT Records are displayed along a timeline according to the date identifiers provided in the message node instances and in the IT Records.

In the example of FIG. 6A, the incoming message to the target system indicates that Node 1 is to be deleted ("del"), Node 5 is to be inserted ("ins"), and Node 3 is to be updated ("upd"). In this example, there is perfect date overlap between node instance 610.1 of the message and IT Record 1 620.1. When perfect date overlap occurs between a node instance and an IT Record, the action code of the message may be applied directly to the IT Record. This is called an "elementary action." Thus, node instance 610.1 may be applied directly to IT Record 1 620.1. This results in deletion of node 1 from the IT Record 1 630.1.

When dates from a message node partially overlaps an IT Record, it causes a record split or even the creation of new records. FIG. 6 illustrates one such example. Node 5 610.2 from the incoming message partially overlaps IT Record 2 620.2 Node 5 and IT Record 2 have common start dates (t2) but the end dates differ (t3 vs. t6). In this example, Node 5 extends further in time than IT Record 2, into a time period (t3-t6) for which no IT Record exists. In this case, the system responds by creating new IT Record 4 (640.3) corresponding to the time t3-t6.

A node message also may include an update action which causes an existing node to be assigned new start and end dates. FIG. 6 illustrates one such example with respect to Node 3 610.3. In this example, Node 3 is shown as preexisting in IT Record 3, having start and end dates of t4 and t5 respectively. The delta message assigns new start and end dates to Node 3 at t3 and t7. In response, the system may identify Node 3 as assigned to IT Record 3 via the mapping table. It also may determine that new IT Record 4 640.3 partially overlaps the dates of the updated Node 3 610.3. In response, the system may insert Node 3 into IT Record 4 640.3. Further, the system may add a new IT record 5 640.4 to cover the time span t6 to t4 and may update the start and end dates of IT Record 3 (shown as 3' in FIG. 6C) to extend from time t6 to t7. Optionally, at the conclusion of node processing, the system may merge two temporally adjacent IT records that have identical node structures and content (for example, IT records 5 and 3').

Here the time split t7 to t5 remains empty. If IT Record 3 620.3 included additional nodes (not shown) that were not updated, then the IT Record would have been split to accommodate new Node 3 extending from time t4 to t7 and to accommodate other node data extending from time t7 to t5. Further another IT Record (not shown) would have been created to accommodate Node 3 from time t6 to t4.

Once the message has been processed, the system also may update the mapping table to reflect the updated IT Records and nodes as generated in response to the delta message. FIG. 6D provides an example of a mapping table created to correspond to the IT Records and nodes of FIG. 6C.

Figure 7A:
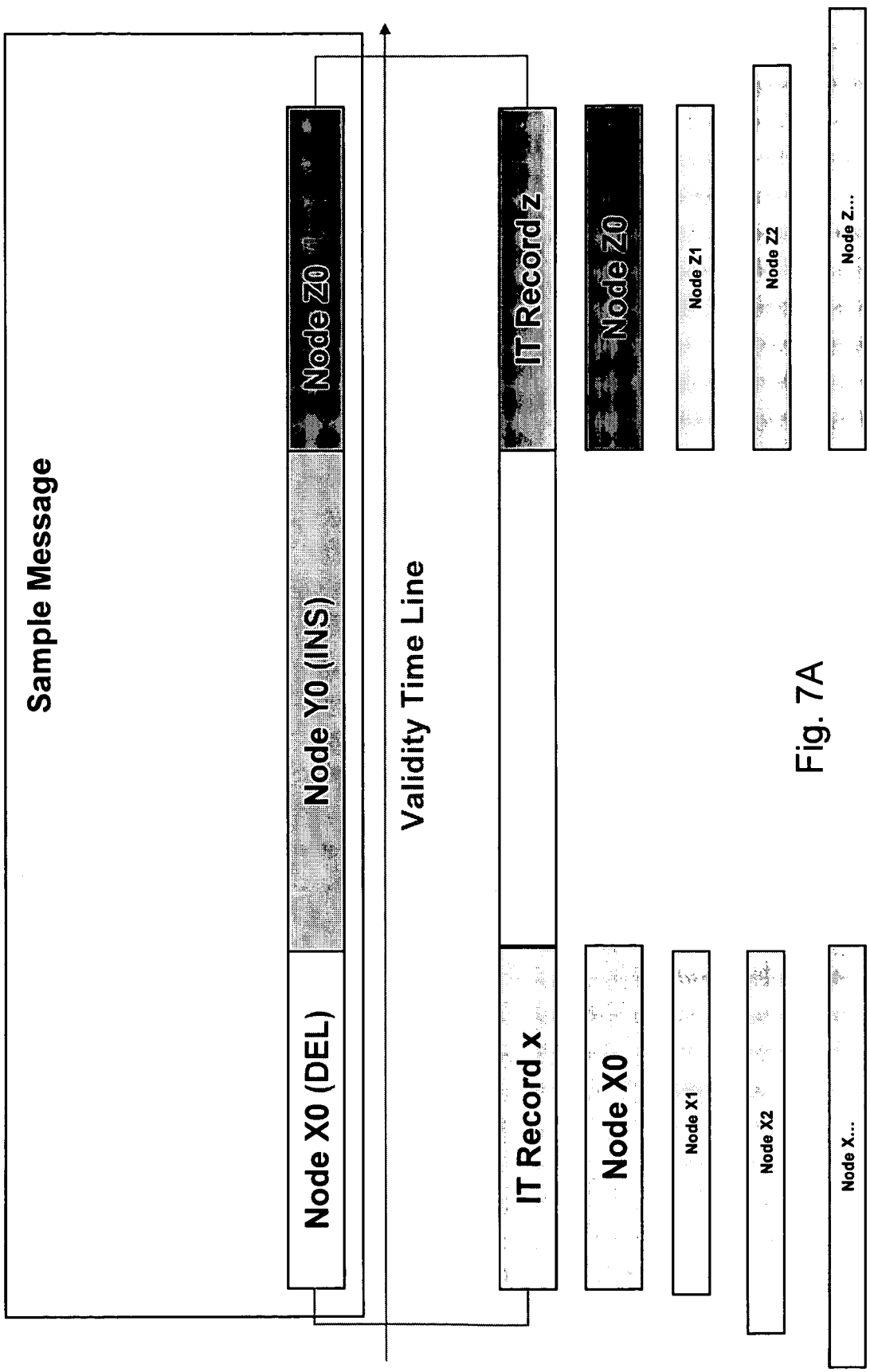
Figure 7B:
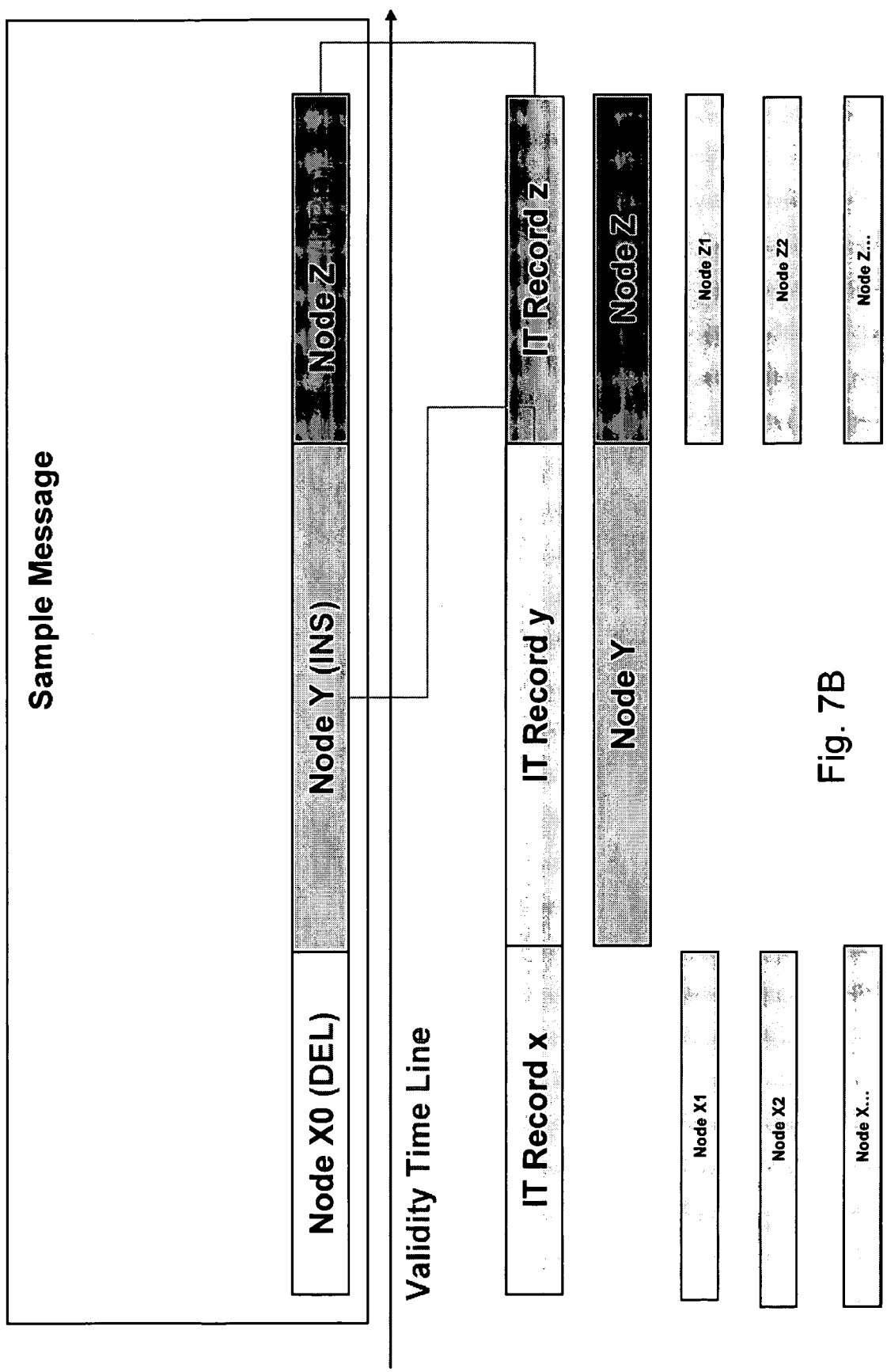

FIG. 7 illustrates an example of elementary actions in the context of an exemplary message and IT records. FIG. 7A illustrates IT records before the message is processed and FIG. 7B illustrates IT records after the message is applied. Specifically, in such a situation, the date ranges of the node messages perfectly coincide with date ranges specified in the IT Records. In this case, the validity periods are not changed in the receiver system. That is, the action codes of delete, insert, and update are processed directly. In this example, therefore, Node X0 is deleted directly from IT Record X as requested in the message. In this example, the IT record x is not deleted if other nodes X1-XM are present within the record. Additionally, in this example, Node Y is created inserted as requested in the message. The effect on the timeline is that the IT Record y is shown, and a node Y pointing to it is inserted. Further, in this example, Node Z is updated as requested in the message. In the example, the start and end dates of the node are not changed by the update and, therefore, the update can be applied directly to the IT Record.

Figure 8:
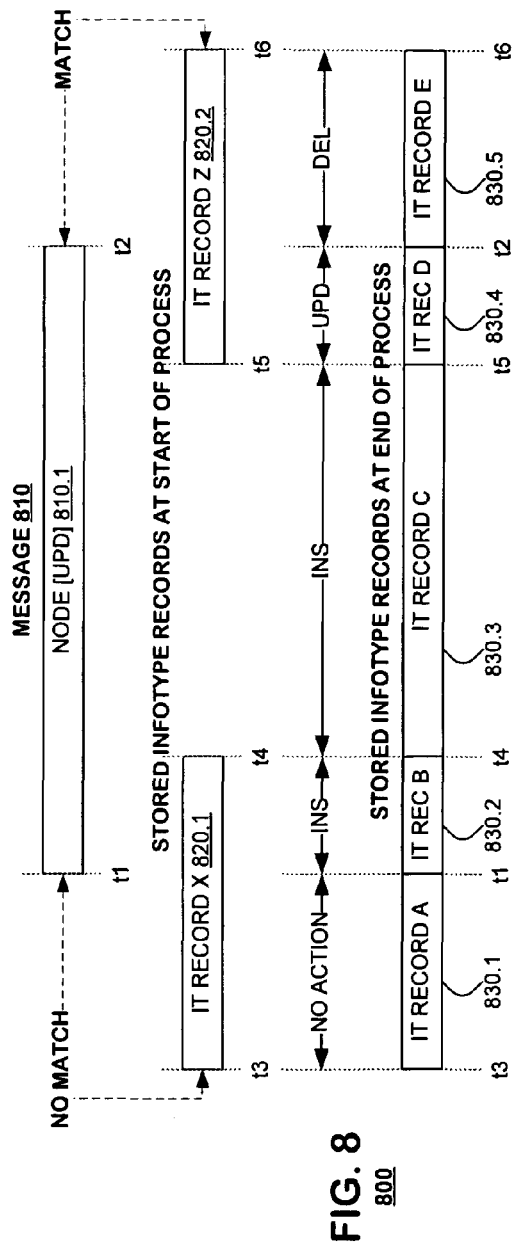

FIG. 8 illustrates a process that may occur when there is imperfect alignment between the dates specified for a node in the delta change message and the date ranges of the stored IT Records. The imperfect alignment causes the system to perform a "complex action," during which the system retrieves possibly affected IT Records and generates a sequence of elementary actions applied for different date ranges that are affected. The example of FIG. 8 illustrates an update action 810.1 applied to a node.

In this example, the message 810 is directed to node that is a member of IT Record Z 820.2 but no other IT Records. The system may retrieve IT Record Z, examine its date range and detect there is imperfect alignment between the date range stored for IT Record Z (t5-t7) and the updated date range identified in the update message 810.1 (t1-t2). In response, the system may cause node Z to be split into two new IT Records D and E 830.4, 830.5.

The system also may search for other IT Records that occur between dates t1 and t5. In this example, the system may detect IT Record X, which extends from date t3 to t4. It may detect that no IT Records exist between dates t4 and t5. In response, the system further may detect imperfect alignment between IT Record X and the new start date of node 3, which causes the system to split IT Record X into two new records A and B 830.1, 830.2. It further may create a new IT Record C extending between dates t4 and t5.

Splitting of an IT Record initially creates two new records with identical node structures. Thus, when IT Record X initially is split, IT Records A and B are identical to each other. Similarly, when IT Record Z initially is split, IT Records D and E are identical to each other. Thereafter, the system derives elementary actions to be performed on the new IT Records to accomplish the complex action. In the example of FIG. 8, the update action code 810.1 may be applied to IT Record D 830.4 as an update, to IT Records B and C 830.2, 830.3 as an insert and to IT Record E 830.5 as a deletion.

Figure 9:
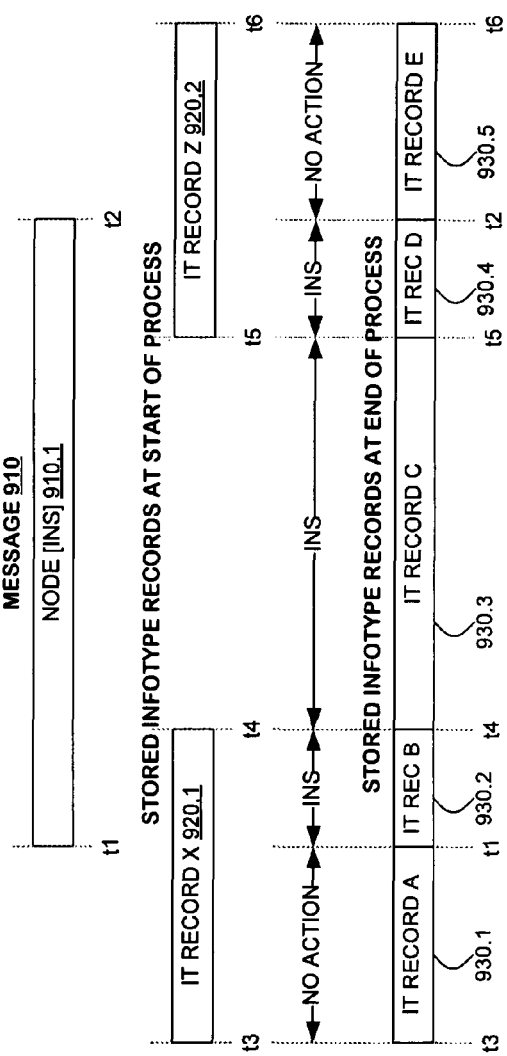

FIG. 9 illustrates another example where the system may detect imperfect alignment between a message node 910.1 and the IT Records 920.1, 920.2 stored by the system. Again, a message node 910.1 may be handled as a complex action, which may involve splitting of IT Records 920.1, 920.2 and derivation of elementary actions. In this example, an insert action 910.1 is requested in which there is an overlap between the node validity periods (t1-t2) and the validity periods of the IT Records (t3-t4 and t5-t6 respectively). Again, existing IT Records may be split such that there is an IT record having a start date (t1) at the start date identified by the node. In this example, IT Record 1 920.1 is split into two new records A and B 930.1, 930.2 Similarly, existing IT Records may be split such that there is an IT record having an end date (t2) that matches the end date identified by the node 910.1. In this example, IT Record Z 920.2 is shown as split into IT Records D and E 930.4, 930.5 Although none is shown in FIG. 9, the system also may retrieve and IT Records that have start and end dates contained in between the start and end dates identified in the node 910.1 (e.g., between dates t4 and t5). Thereafter, the system may derive and apply elementary actions to each of the IT records that fall within the start and end dates specified by the node 910.1.

In an embodiment, elementary actions may be derived from original message actions according to Table 1. For each new IT Record generated by a split, the system may determine whether the node range overlaps the date range of the split and whether the node maps to the old IT Record covering the split and further may identify the action code presented in the node message. The system may derive an elementary action as shown below:

TABLE 1

| CONDITIONS | | SYSTEM RESPONSE | | |
|---|---|---|---|---|
| DOES NODE OVERLAP THE SPLIT? | DOES NODE MAP TO THE IT RECORD? | MESSAGE ACTION CODE | | |
| | | DEL | UPD | INS |
| Yes | Yes | DEL | UPD | ERROR |
| Yes | No | ERROR | INS | INS |
| No | Yes | NO ACTION | DEL | ERROR |
| No | No | NO ACTION | NO ACTION | NO ACTION |

Figure 10:
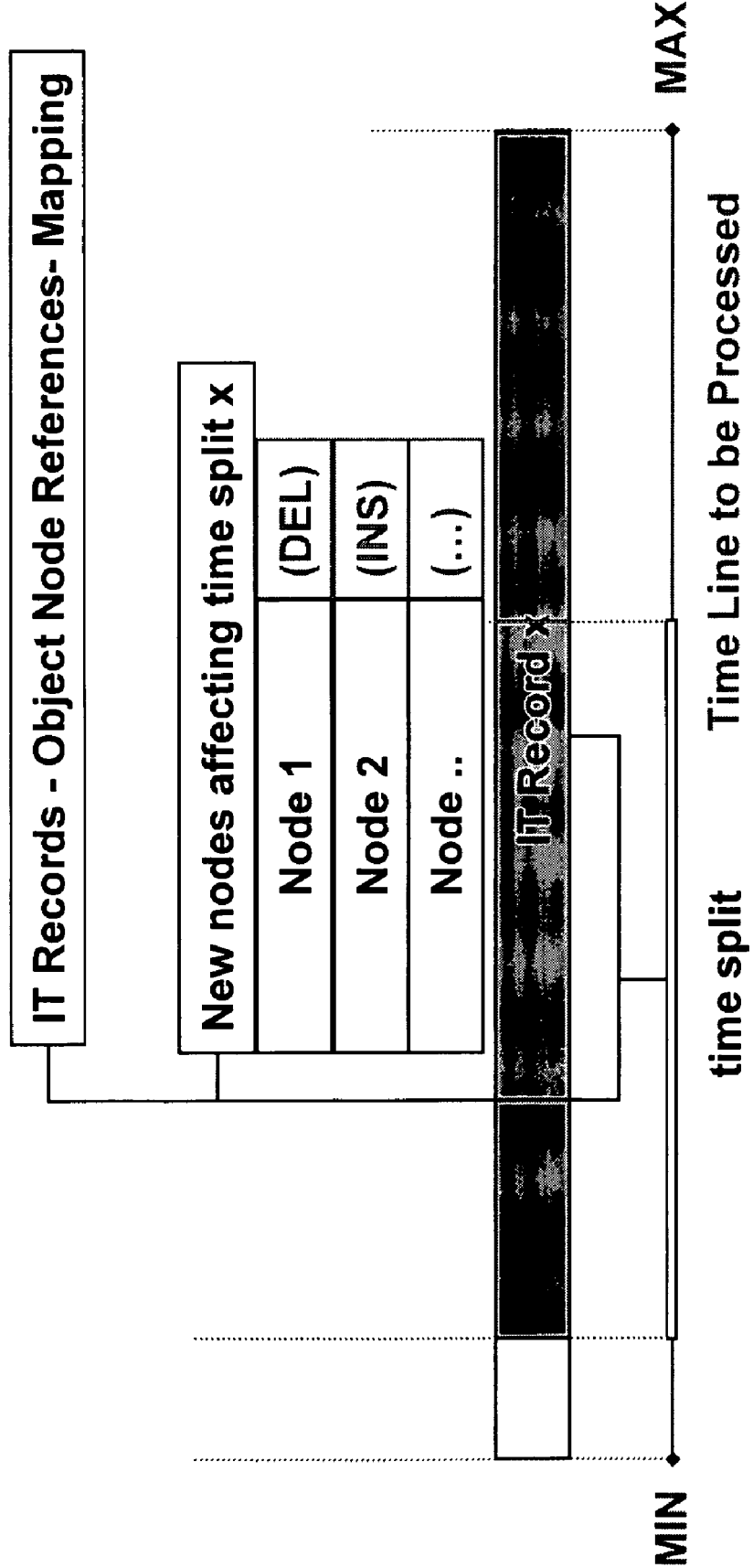

FIG. 10 shows an example embodiment of a "timeline to be processed" according to present invention. For each business key, a timeline to be processed is built. Each time split is addressed. A time split itself is a result of joining all validity periods of incoming nodes affecting the validity time line of a given system feature and the validity periods of the set of (IT) records representing the current state of this feature. For example, all "new" nodes affecting the time split is addressed. For example, the former Infotype (IT) record valid at the time split is addressed. For example, the corresponding node mapping is addressed. In an embodiment, the timeline to be processed is the joining of all BEGDA and ENDDA values of the existing Infotype records and StartDate and EndDate values of the "new" nodes. For example, a runtime process of building the join of all participating time splits works like an ABAP PROVIDE-ENDPROVIDE loop or other like process. (Technical Remark: Actually within an ABAP program the PROVIDE-ENDPROVIDE statement cannot simply be deployed as the number of involved data types is not statically fixed but depends on the message content.)

Figure 11:
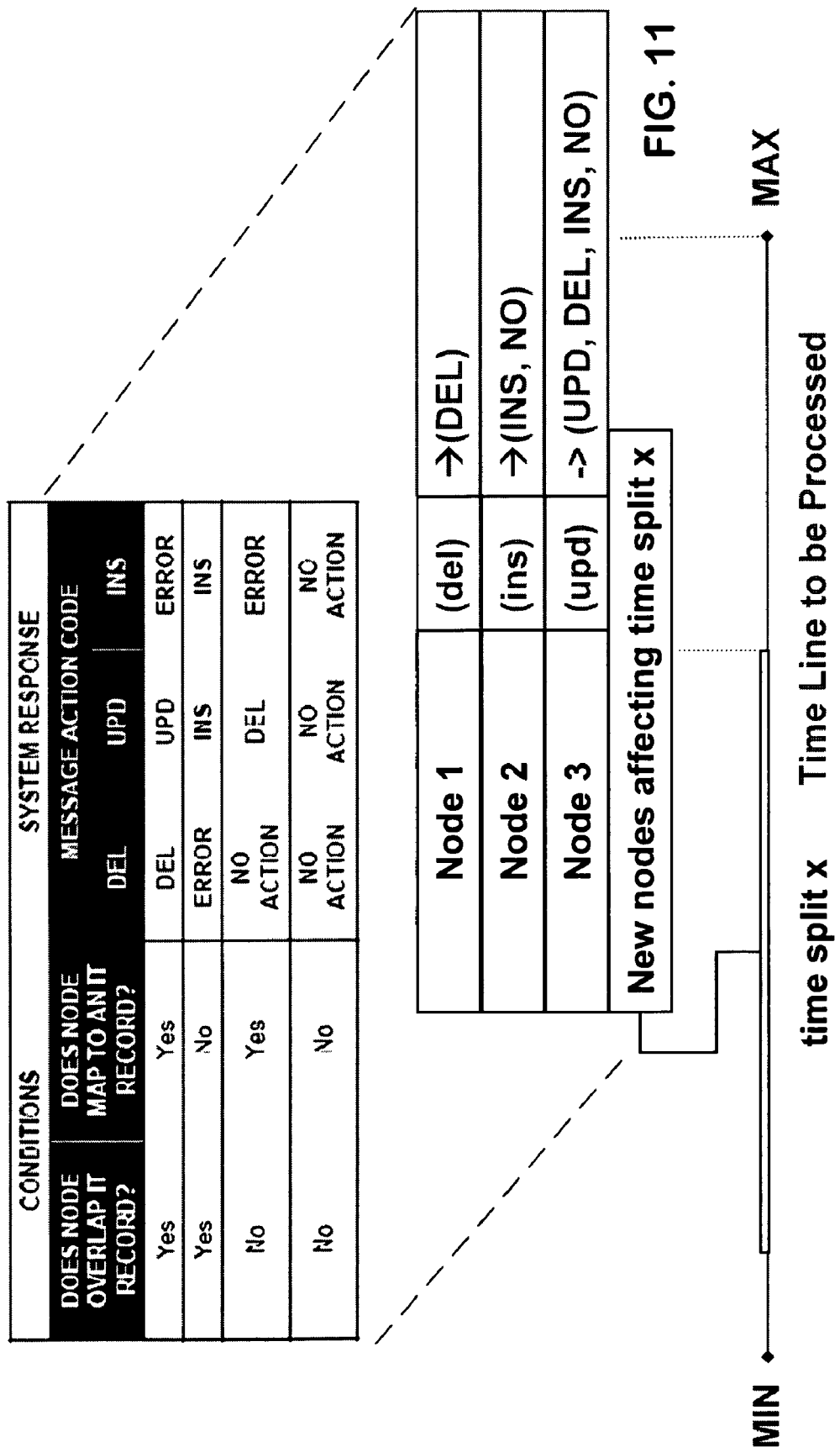

For each time split and node instance, an elementary action is derived from the original action code according to the situation as shown in FIG. 11, for example. Example situations are illustrated by FIGS. 8 and 9 herein. Next, all IT or Infotype records are deleted. However, before deleting the IT records, the contents must be saved for recreation purposes later in the process. Since, for example, the BEGDA (begin date) and/or ENDDA (end date) may have changed, the IT records are deleted to prevent inconsistencies. In an embodiment, only IT records involving a changed BEGDA and/or ENDDA are deleted and later recreated according to the process. In an embodiment, all IT records are deleted and later recreated according to the process. Next, all mapping entries pointing on the deleted IT records are deleted. Next, the IT records are recreated, conserving the former content for all time splits, and processing new node content according to the derived elementary actions. In an embodiment, the recreation step is skipped when the whole content of the IT record becomes empty as soon as all nodes are deleted. Next, the mapping is restored, taking into account the new time splits and nodes. In an embodiment, mapping for nodes which are not a part of the message must also be restored according to the new/updated time split.

In an embodiment, only the validity period is changed in a source system. The corresponding message node includes only the changed new StartDate and/or EndDate with action code upd="02." In this situation, for example, the following elementary action codes may be possible. First "UPD" is derived for the time split representing the overlap with the former validity period. When no further content is changed, the elementary action becomes NO ACTION. Otherwise, the elementary action is UPD (update). An "INS" is derived for time splits representing new periods at which the node is newly valid. Since no further content is provided by the message, the content to be inserted needs to be derived form an existing Infotype record. For example, the Infotype record filled with the needed content may be found via the ObjectNodeReference—IT Record mapping. A "DEL" is derived for time splits representing periods the node is no longer valid. For example, deletion means to initialize only fields filled by the node under consideration.

In an embodiment of the present invention, different levels of mapping details are stored in the target system, depending upon the situation. For illustrative purposes, three situations are discussed in view of the initialization of the Infotype fields on the elementary action DEL (delete). Other situations are contemplated. For example, ObjectNodeReference—IT Record Business Key mapping concerns handling the elementary action DEL caused by a change in the validity period. To handle this action, the affected time split is derived, for example, from the ObjectNodeReference of the processed node. If the relationship(s) between the node elements and the Infotype fields is fixed, then it will be clear which fields are affected and will be initialized. For example, Node element— IT Field mapping concerns the relationship between the node elements and the IT fields. For example, such relationship is dynamically determined for each processed node instance. The initialization needs to take into account the Node element—IT Field mapping of the former process. The correct fields to be initialized are findable only if the mapping information is stored in the target system so that it can be used in such activities later. For example, Node Content is considered in specific situations. For example, if node elements are aggregated into one Infotype field, one cannot easily initialize the fields, and the inverse function is applied. Because the node value is needed for the inverse function, it is necessary to store the node content in the target system in such cases.

In an embodiment, processing of node messages may occur according to the following pseudocode:

```
Notation:
N       Node of the (delta) message
        containing:
            Object node reference          n                                        (mandatory)
            (Message) Action Code          ac (01 = insert, 02, update, 03 = delete) (mandatory)
            Validity Period                v (startDate, endDate)                    (optional)
            Elements, changed values       [e]                                       (optional)
            In case of update(02) v or [e] must not empty.
            In case of insert(01) v and [e] must not empty.
[N]     List of nodes
n       Object node reference which identifies a node of a business object in the source system
        Within a message each n is mandatory for N. N is uniquely identified by n. N(n) and n(N)
        are functions.
        This means: n identifies a business object node in the source system as well as N in the
        message
F       Time dependent feature of the target system which obeys time constraint 1 or 2.
R       Infotype-like database record
        containing:
            key       r
            List of fields   [f]
[R]     F is represented by a set of records [R] with equal business keys but different validity
        periods (BEGDA, ENDDA) since field content is changing in time.
r       Key of a
        R so that R(r) and r(R) are a unique functions
        containing:
F       business key corresponds to the semantic of
        (BEGDA, ENDDA) as validity periods
[n, r]  Mapping table storing relations between business object nodes (Source System) and
        feature records (Target System). In this table all keys
n and r are stored.
T       Time point like ENDDA in r or startDate in v
[T]     List of time points
I       Time split, a pair of ordered dates like BEGDA and ENDDA in r (ENDDA ≧ BEGDA)
[I]     List of time intervals without overlap
dac     Beside the original Message action code ac in N, there will be a context dependent action
        code, derived from ac and further overlap situations between N and I. So-called derived
        action code.
        (→ Action code derivation table)
[N](I)  List of nodes overlapping split I (at least partially). To be an element of this list v must be
        provided.
[N](R)  List of nodes, for which a mapping onto
        R exist
```

-continued

| | |
|---|---|
| R(I) | Record overlapping split I |
| R_I | Record with (BEGDA, ENDDA) = I |
| [R]_IM | List of records related to nodes with changed v, so that the new v overlaps I, while the former does not. |
| [N](R(I)) | List of nodes, for which a mapping onto R(I) exist |
| [N](~I) | List of nodes affecting the time split I. [N](~I) ≡ [N](I) ∪ [N](R(I)) |
| [n, r(R(I))] | Subset of the mapping table [n, r] selected with the condition r = r(R(I)) |
| [n(~I), r] | Subset of the mapping table [n, r] selected with the condition N(n) ∈ [N](~I) |
| [N]{ac} | A subset of [N] defined by a certain action code ac |
| [n]{ac} | Keys of subset |
| [N]{ac} | |
| [N]{dac} | A subset of [N](I)defined by a certain derived action code dac |
| [n]{dac} | Keys of subset [N]{dac} |

Preconditions:
Feature
F to be updated in the target system is given
All nodes [N] of the incoming message affecting feature
F are selected
All records
[R] representing
F are selected from the database of the target system.
For all records in
[R] the mapping table [n, r] is selected from the database of the target system.
    Algorithm:
Time Line
  For all [N] insert startDate and endDate as time points in a list [T], if v was provided in the message.
  For all
  [R] insert BEGDA and ENDDA as time points in a List [T]. It may occur that startDate and/or endDate is not part of a node N since the validity period has not been changed in the source system. In this case, the time points of [R] still representing the source system state.
  Sort [T] and delete duplicated time points
  Generate an interval list [I] from [T] by combining nearest neighbours
Delete from DB
  Delete
  [R] from database, but still keep the list
  [R]
  Delete [n,r] from database, but still keep the list [n,r]
Process time splits
  for each time split I of list [I]:
  Addressing
  Address a record R(I) according the overlap with I. Even if there is no overlap, go on
  Address all nodes from [N] affecting time split I, ≡ [N](~I)
  Two preliminary lists are built from [N] with nodes:
  if v is provided in N → check overlap with I if yes     → insert N into [N](I)
      if ac of N is 02 or 03 check [n, r] for R(I) (if R(I) was found)   → insert N into [N](R(I))
    [N](~I) is the set union of this two lists
  Create a local copy of mapping table taking entries of R(I) from the mapping [n,r]   → [n , r(R(I))]
  This mapping list may contain keys of nodes not being part of the message.
  Create a local copy of mapping table for [N](~I) from the mapping [n,r]     → [n(~I) , r] . This mapping list may contain keys of records that do not overlap.
  Finally we have collected for I: R(I), [N](~I) , [n(I) , r] , [n , r(R(I))]
  A new mapping table [n , r](~I) is initially built as union set of [n(~I) , r] ∪ [n, r(R(I))]
  [n , r](~I) will be changed in the next steps
  Action Code Derivation
  for each N in [N](~I)
    Derive action code dac according to the derivation table [01,02,03] → [del,ins,upd]
  Regroup [N](~I) into new node lists according [N](del), [N](upd), [N](ins)
  Create an initial (= "empty") record R_I (BEGDA, ENDDA = I)
  Set the business key according to the feature to be updated
  Fill field values of R_I according to R(I) , if R(I) was found under Addressing
  for each N in [N](del)
    Delete the field content from R_I
    Delete entries with key n(N) from [n , r](~I)
  for each N in [N](upd)
    Change the field content of R_I according to the node elements [e] of N
  for each N in [N](ins)
    Insert the field content into R_I
      according to the node elements [e] of N
      according to fields of [R]_IM moved into the time split by validity period change. The list
        [R]_IM mentioned here can be found by comparing ac and dac and in case of (02 ,
        ins) the record key can be found in the mapping table [n , r](~I)
    Insert key mapping n(N) , r(R_I) into [n , r](~I)
  For all entries in [n , r](~I)
    if they overlap with I     → change BEGDA, ENDDA of r to I according to R_I
    if not                     → delete them from [n , r](~I)
  Final Update
  Insert R_I into the database if there is at least one mapping in [n , r](~I)
  Insert mapping entries [n , r](~I) into the database.

In embodiments of the present invention, an administrator can receive a new product via, for example, the Internet, a company Intranet, local area network (LAN), wide-access area network (WAN), a hardwired connection, a computer readable medium such as a DVD, CDROM, disk, and/or flash memory.

Software applications, or programs, may be stored in a business system. The software applications may be stored, for example, in a distribution server in communication with other servers and workstations in the business system. The applications may be stored and accessed using various storage devices and computer systems available. An administrator may access the software applications in the business system.

The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored in a machine readable medium or transmitted by a data signal embodied in a carrier waive over a transmission medium or a communication link. The "machine readable medium" may include any medium that can store and/or transfer information. Examples of a machine readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for processing data synchronization messages in a data processing system, comprising:
    developing a processing timeline from nodes contained in a received synchronization message and from a plurality of stored data records, the nodes and the stored data records identifying respective start and end dates for data contained therein,
    for each node of the synchronization message,
        determining whether the start and end dates of the node overlap start and end dates of stored data records, and
        for the overlapping data records, deriving actions to take upon the respective data records based on an action identified for the node and an overlap condition detected between the data record and the node's start and end dates, and
        executing the identified actions upon the data records,
        wherein, if one of the dates for the node falls between the start and end dates of a stored data record, splitting the respective data record into a pair of new data records, one of which is fully overlapped by the node of the synchronization message and the other of which is not overlapped by the node of the synchronization message.

2. The method of claim 1, wherein, if the node's action is an update:
    for the new record that is fully overlapped by the node, determining whether the respective record stores a node corresponding to the node of the synchronization message, and
    if so, causing an update operation to be performed on the respective new record,
    if not, causing an insert operation to be performed on the respective new record.

3. The method of claim 1, wherein, if the node's action is an update:
    for the new record that is not overlapped by the node, determining whether the respective record stores a node corresponding to the node of the synchronization message, and if so, deleting the node from the respective new record.

4. The method of claim 1, wherein, if the node's action is an insert, causing an insert operation to be performed on the new record that is fully overlapped by the node.

5. The method of claim 1, wherein, if the node's action is a delete, causing a delete operation to be performed on the new record that is fully overlapped by the node.

6. The method of claim 1, wherein, if the dates for the node covers a time period for which there are no stored data records, creating a new data record corresponding to the time period and inserting the node of the synchronization message into the new data record.

7. The method of claim 1, further comprising:
    upon receipt of the synchronization message, for each node contained therein, identifying data records storing common nodes via a stored mapping table that associates node identifiers with stored data records.

8. The method of claim 7, further comprising, after the executing, updating the mapping table with node identifiers of all data records.

9. A data synchronization method comprising:
    responsive to a synchronization message that identifies changes to time dependent data in a hierarchical structure:
        retrieving node identifiers from the synchronization message, and
        identifying, with reference to a mapping table, stored data records having nodes that match the nodes contained in the synchronization message;
    retrieving the identified data records,
    building a validity time line from date identifiers stored in the identified data records and date identifiers contained in the synchronization message associated with the nodes,
    for any date identifier of a node that intersects a data record, splitting the data record deriving elementary actions to perform upon the data records, the elementary actions determined based on a node action contained in the synchronization message and an overlap condition detected between the data records and the respective node's start and end dates as contained in the synchronization message,
    performing deletion elementary actions upon the data records,
    executing remaining elementary actions upon the data records, and updating the mapping table with identifiers of all data records and the nodes of the data records.

10. The method of claim 9, wherein, if the node's action is an update:

when a new record is fully overlapped by the respective node's start and end dates, determining whether the respective new record stores a node corresponding to the node of the synchronization message, and if so, performing an update operation on the respective new record, if not, performing an insert operation on the respective new record.

11. The method of claim 10, wherein, if the node's action is an update:

when a new record is not overlapped by the respective node's start and end dates, determining whether the respective new record stores a node corresponding to the node of the synchronization message, and if so, deleting the node from the respective new record.

12. The method of claim 10, wherein, if the node's action is an insert, causing an insert operation to be performed on the new record that is fully overlapped by the node.

13. The method of claim 9, further comprising, if the dates for the node covers a time period for which there are no stored data records, creating a new data record corresponding to the time period and inserting the node of the synchronization message into the new data record.

* * * * *